United States Patent [19]

Tsui et al.

[11] Patent Number: 4,699,478

[45] Date of Patent: Oct. 13, 1987

[54] SELF-CLEANING REARVIEW MIRROR

[76] Inventors: Yu-Ming Tsui, No. 34-3, 31Alley, 59 Lane, Sec.5,Nanking E.Rd., Taiei, Taiwan, 105; Shyh-Her Sheu, No. 18, Shihchien Street, Peitoa, Taipei, Taiwan, 111

[21] Appl. No.: 832,367

[22] Filed: Feb. 24, 1986

[51] Int. Cl.[4] .................... G02B 00/00; E05D 11/00
[52] U.S. Cl. .................................. 350/583; 15/250 B
[58] Field of Search ............... 350/582, 583; 15/250 B

[56] References Cited

FOREIGN PATENT DOCUMENTS

| 0017736 | 2/1981 | Japan | 350/583 |
| 0041225 | 3/1982 | Japan | 350/583 |
| 828175 | 2/1960 | United Kingdom | 350/583 |

Primary Examiner—John K. Corbin
Assistant Examiner—Vincent J. Lemmo

[57] ABSTRACT

An object of the present invention is to provide a self-cleaning rearview mirror, attached to the outside of many different kinds of vehicles. An advantage of the invention is that it provides a clear rearview for the drivers.

1 Claim, 2 Drawing Figures ated by a DC
SELF-CLEANING REARVIEW MIRROR

FIELD OF THE INVENTION

This invention is concerned with a rearview mirror, particularly a rearview mirror which can be rotated for self-cleaning in use.

DESCRIPTION OF PRIOR ART

The conventional rearview mirror as attached to the outside of vehicles is just a simple device, which can easily be shadowed by dust or raindrops or snowflakes, so that the rearview mirror can not provide a clear rearview for the driver.

SUMMARY OF THE INVENTION

An object of the present invention is to provide a self-cleaning rearview mirror. It can be rotated by a DC motor and through centrifugal force, the mirror is cleared from raindrops or snowflakes.

An advantage of the invention is that it provides a clear rearview for the drivers.

Briefly, this invention comprises a rotary rearview mirror and a non-swinging wiper. In case of rain or snow, the raindrops or snowflakes can not stay on the rearview mirror when the rearview mirror rotates for speeds from 2600 to 2000 r.p.m. In case of clear day, the non-swinging wiper can also wipe off dust from the rotating rearview mirror.

Figure 1:
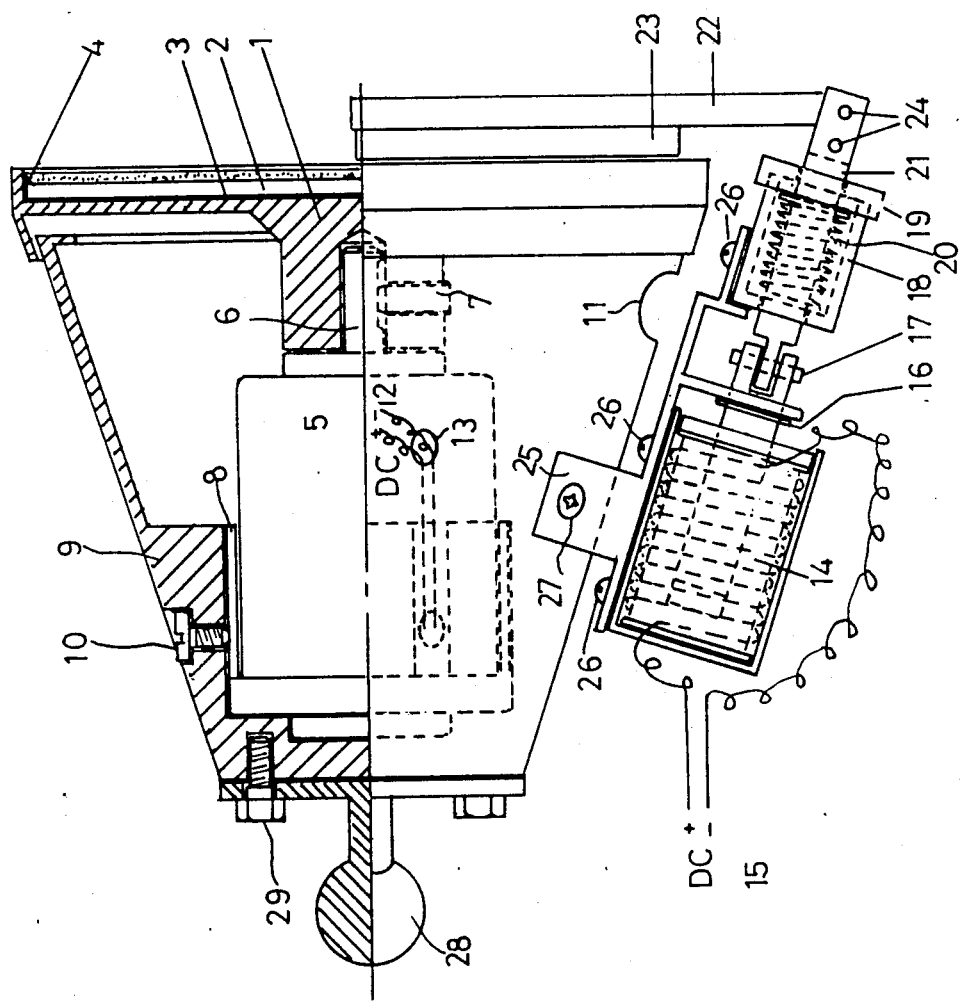
FIG. 1 is a sectional partially schematic representation of the self-cleaning rearview mirror.
Figure 2:
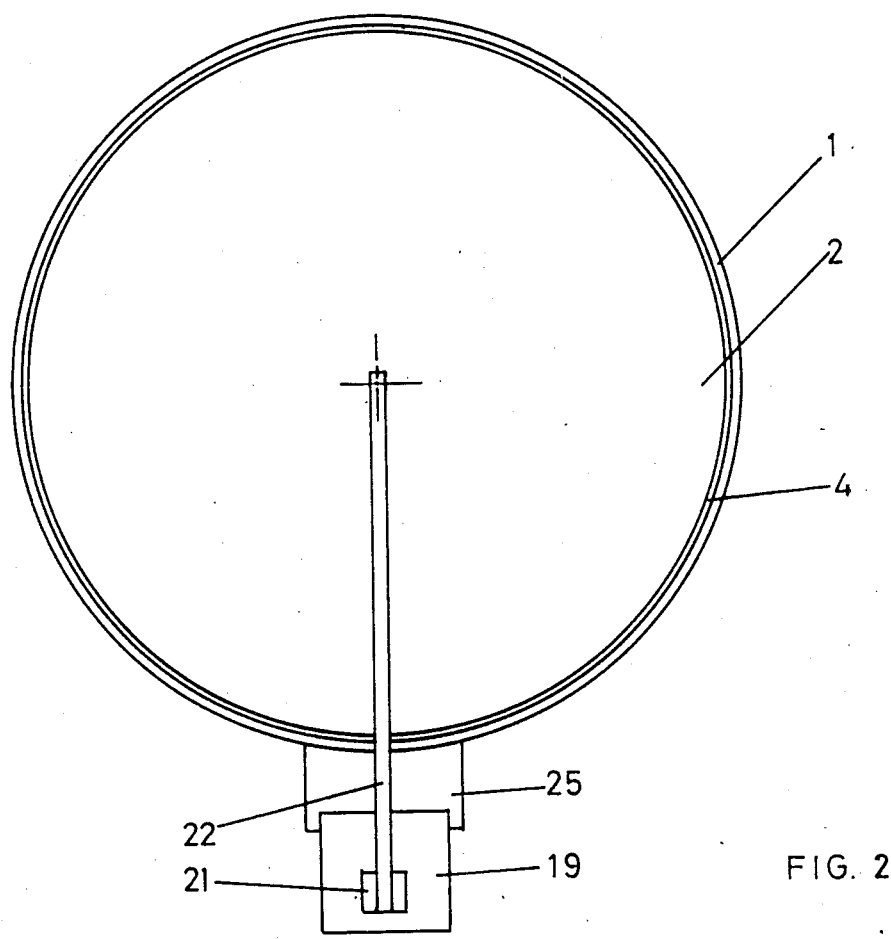
FIG. 2 is a front view of the self-cleaning mirror.

A list of the parts are as follows:

| PARTS | NAME OF PARTS | QUANTITY | RAW MATERIALS | METHOD OF MANUFACTURING |
| --- | --- | --- | --- | --- |
| 1 | Disk | 1 | Aluminum Alloy or ABS Resin ABS = Acrylonitrle Butadiene-Styrene | Pressure Die Casting or Injection Moulding |
| 2 | Mirror | 1 | Mirror plate | |
| 3 | Superior Gleu | | | |
| 4 | Waterproof Sealant | | Silicone Sealant | |
| 5 | DC Motor | 1 | | |
| 6 | Shaft of DC Motor | 1 | | |
| 7 | Hexagon Socket Head Cap Screw Bolt | 1 | | |
| 8 | Split Ring | 1 | Aluminum Alloy or ABS Resin | Pressure Die Casting or Injection Moulding |
| 9 | Body | 1 | Aluminum Alloy or ABS Resin | Pressure Die Casting or Injection Moulding |
| 10 | Screw Bolt | 1 | Stainless Steel | |
| 11 | Assembling Hole | 1 | | |
| 12 | Wire of DC Motor | | | |
| 13 | Outlet for the Wire of DC Motor 5 | | | |
| 14 | DC Electric Magnet | 1 | | |
| 15 | Wire of DC Magnet | | | |
| 16 | Ring | 1 | Stainless Steel | |
| 17 | Split Spring Pin | 1 | | |
| 18 | Control Box | 1 | Aluminum Alloy or ABS Resin | Pressure Die Casting or Injection Moulding |
| 19 | Terminal Cap | 1 | Aluminum Alloy or ABS Resin | Pressure Die Casting or Injection Moulding Fixed to Control Box 18 |
| 20 | Spring | 1 | | |
| 21 | Lever | 1 | Stainless Steel | |
| 22 | Holder of Wiper | 1 | Stainless Steel | |
| 23 | Non-Swinging Wiper | 1 | Neoprene | |
| 24 | Rivet | 2 | Aluminum Alloy | |
| 25 | Holder | 1 | Aluminum Extrusion | |
| 26 | Screw Bolt | 6 | Stainless Steel | |
| 27 | Screw Bolt | 2 | Stainless Steel | |
| 28 | Universal Jointer | 1 | Stainless Steel | |
| 29 | Screw Bolt | 4 | Stainless Steel | |

DETAILED DESCRIPTION OF THE INVENTION

A DC motor 5 is fixed in a body 9 with split ring 8 and screw bolt 10. The hole 13 on the body 9 is an outlet for the wire of DC motor 5. The mirror 2 is fixed on the disk 1 and sealed water proof with the silicone sealant 4 around the edge of mirror 2. The disk 1 with mirror 2 together with screw bolt 7 must be checked for good balance by a balancing machine. The balanced disk 1 with mirror 2 can thereafter be fixed to the shaft 6 of DC motor 5 with screw bolt 7. The screw bolt 7 can be turned tight to the shaft 6 by a screwdriver through the hole 11. The control box 18 with terminal cap 19, lever 21 and spring 20 are assembled for a wiper controller. The terminal cap 19 is fixed with powerglue on the control box 18. The lever 21 is linked to DC electric magnet 14 with split spring pin 17. The ring 16 is a moving range limiter welded on the shaft of the magnet 14. The universal jointer 28 is fixed to the body 9 with four pieces of screw bolt 29. The holder 25 is fixed under the body 9 with two pieces of screw bolt 27. The DC electric magnet 14 and control box 18 are fixed on the holder 25 with six pieces of screw bolt 26. The holder of wiper 22 and non-swinging wiper 23 are fixed on the level 21 with two pieces of rivet 24. The top of the wiper 23 extends over the center of mirror 2 about 2 mm. The DC electric magnet 14 and control box 18 will be covered with a water proof box.

When the DC electric current switch is on, the mirror 2 will rotate for speeds about 2600 to 2000 r.p.m. The raindrops or snowflakes can not stay on the mirror 2 at this rotating speed. If another DC timer switch is on, the wiper 23 will touch the rotated mirror 2 by DC electric magnet 14, the dust will be wiped off from the mirror 2, the DC timer switch is set for instant contact, the wiper will be quickly off from the rotated mirror 2 with the help of the spring 20.

What we claim is:

1. A self-cleaning rearview mirror mounted outside of vehicles, comprising a round mirror fixed on a rigid disk which is assembled to the shaft of a DC motor, a non-swinging wiper in which one end slightly exceeds the center of the mirror surface, and the other end is connected to a lever which penetrates through a control box stored with a spring and in turn, connected to a DC electric magnet, which is characterized in that there is a gap of about 2 mm between said wiper and said mirror surface, and said wiper can be caused to have instantaneous contact with said mirror surface by the force of said DC electric magnet, a DC electric timer switch, and said control box.

* * * * *